US012294188B2

(12) United States Patent
Shimizu et al.

(10) Patent No.: US 12,294,188 B2
(45) Date of Patent: May 6, 2025

(54) FUSE-EQUIPPED CONNECTOR, AND CONNECTOR STRUCTURE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hiroshi Shimizu, Mie (JP); Hitoshi Takeda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 312 days.

(21) Appl. No.: 17/925,451

(22) PCT Filed: May 12, 2021

(86) PCT No.: PCT/JP2021/018060
§ 371 (c)(1),
(2) Date: Nov. 15, 2022

(87) PCT Pub. No.: WO2021/246121
PCT Pub. Date: Dec. 9, 2021

(65) Prior Publication Data
US 2023/0187882 A1 Jun. 15, 2023

(30) Foreign Application Priority Data
Jun. 1, 2020 (JP) ................................ 2020-095300

(51) Int. Cl.
*H01R 13/688* (2011.01)

(52) U.S. Cl.
CPC ................................ *H01R 13/688* (2013.01)

(58) Field of Classification Search
CPC .............. H01R 13/688; H01R 13/6272; H01R 31/065; H01H 85/202; H01H 85/0026; H01H 85/201
See application file for complete search history.

(56) References Cited

U.S. PATENT DOCUMENTS 6,293,832 B1 * 9/2001 Yamamoto .......... H01R 13/113 439/850
6,784,783 B2 * 8/2004 Scoggin .............. H01H 85/547 337/194
(Continued)

FOREIGN PATENT DOCUMENTS

| | | |
|---|---|---|
| CN | 202094066 | 12/2011 |
| JP | 2015-079723 | 4/2015 |

OTHER PUBLICATIONS

International Search Report issued in International Bureau of WIPO Patent Application No. PCT/JP2021/018060, dated Jul. 27, 2021, along with an English translation thereof.

*Primary Examiner* — Travis S Chambers
(74) *Attorney, Agent, or Firm* — Greenblum & Bernstein, P.L.C.

(57) ABSTRACT

Provided is a fuse-equipped connector including: a housing; a fuse terminal configured to be attached to the housing; a holder configured to be attached to the housing; and a fuse configured to be attached to the holder, and be electrically connected to the fuse terminal, wherein the housing includes a lock portion, and the holder includes a lock receiving portion configured to be elastically locked to the lock portion, the holder includes a fuse accommodating portion in which the fuse is to be removably accommodated, the fuse includes a terminal portion, and the fuse terminal includes a
(Continued)

fuse elastic contact portion configured to come into elastic contact with the terminal portion of the fuse.

10 Claims, 10 Drawing Sheets

(56) References Cited

U.S. PATENT DOCUMENTS

| | | | | |
|---|---|---|---|---|
| 8,152,576 | B2 * | 4/2012 | Nakamura | H01R 13/113 439/852 |
| 9,666,957 | B2 * | 5/2017 | Endo | H01R 13/113 |
| 10,230,190 | B2 * | 3/2019 | Frimmersdorf | H01R 13/18 |
| 10,886,089 | B2 * | 1/2021 | Brakefield | H01H 85/22 |
| 11,901,676 | B2 * | 2/2024 | Mathias | H01R 13/7175 |
| 2009/0247015 | A1 * | 10/2009 | Taniguchi | H01H 85/547 439/620.33 |
| 2012/0289086 | A1 * | 11/2012 | Jetton | H01H 85/0026 439/587 |
| 2016/0233625 | A1 | 8/2016 | Kato et al. | |
| 2016/0307720 | A1 | 10/2016 | Guillanton et al. | |
| 2016/0322187 | A1 | 11/2016 | Guillanton et al. | |

* cited by examiner

FUSE-EQUIPPED CONNECTOR, AND CONNECTOR STRUCTURE

TECHNICAL FIELD

The present disclosure relates to a fuse-equipped connector, and a connector structure.

BACKGROUND ART

As a conventional fuse-equipped connector, the fuse-equipped connector described in JP 2015-79723A is known. In this fuse-equipped connector, a fuse is fixed to a bus bar piece using a screw portion and a nut. The fuse is removed by loosening the screw portion or the nut, and is thereafter replaced. The replaced new fuse is fixed again using the screw portion and the nut.

CITATION LIST

Patent Document

Patent Document 1: JP 2015-79723A

SUMMARY OF INVENTION

Technical Problem

However, the above-described configuration is problematic in that the screw portion or the nut may come off when the fuse is replaced, resulting in a reduction in the efficiency of a fuse replacement operation.

The present disclosure has been completed in view of the above-described circumstances, and an object thereof is to provide a technique associated with a fuse-equipped connector for which the efficiency of a fuse replacement operation has been improved.

Solution to Problem

The present disclosure relates to a fuse-equipped connector including: a housing; a fuse terminal configured to be attached to the housing; a holder configured to be attached to the housing; and a fuse configured to be attached to the holder, and be electrically connected to the fuse terminal, wherein the housing includes a lock portion, and the holder includes a lock receiving portion configured to be elastically locked to the lock portion, the holder includes a fuse accommodating portion in which the fuse is to be removably accommodated, the fuse includes a terminal portion, and the fuse terminal includes a fuse elastic contact portion configured to come into elastic contact with the terminal portion of the fuse.

Advantageous Effects of Invention

According to the present disclosure, it is possible to improve the efficiency of a fuse replacement operation.

DESCRIPTION OF EMBODIMENTS

Figure 1:
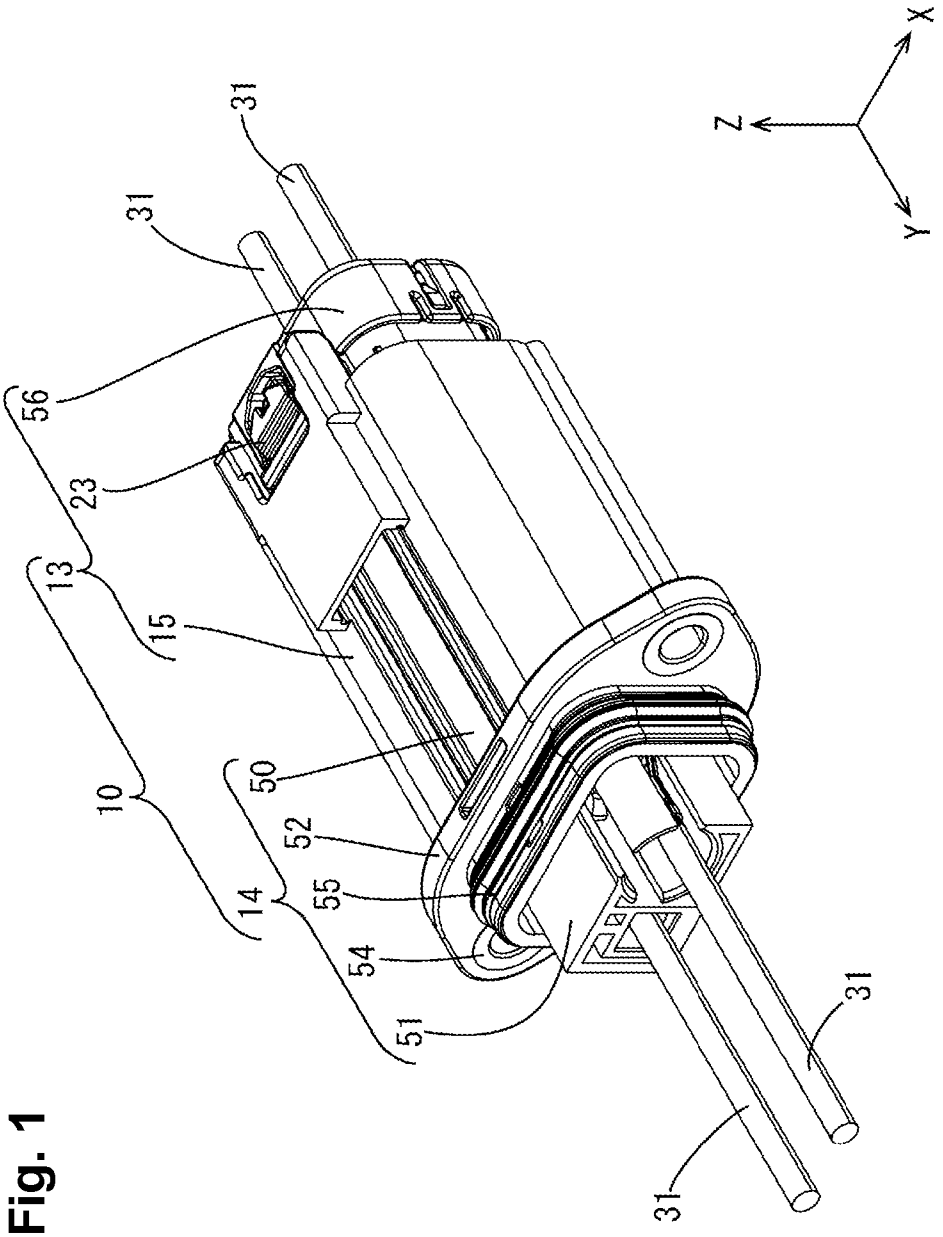
FIG. 1 is a perspective view showing a connector structure according to Embodiment 1.

Description of Embodiments of the Present Disclosure

First, embodiments of the present disclosure will be listed and described.

(1) The present disclosure relates to a fuse-equipped connector including: a housing; a fuse terminal configured to be attached to the housing; a holder configured to be attached to the housing; and a fuse configured to be attached to the holder, and be electrically connected to the fuse terminal, wherein the housing includes a lock portion, and the holder includes a lock receiving portion configured to be elastically locked to the lock portion, the holder includes a fuse accommodating portion in which the fuse is to be removably accommodated, the fuse includes a terminal portion, and the fuse terminal includes a fuse elastic contact portion configured to come into elastic contact with the terminal portion of the fuse.

The lock portion and the lock receiving portion are disengaged from each other to separate the housing and the holder from each other. Consequently, the fuse elastic contact portion of the fuse terminal is separated from the terminal portion of the fuse, whereby the electrical connection between the fuse terminal and the fuse is disconnected. The fuse is removed from the fuse accommodating portion of the holder, and is replaced with a new fuse. The holder in which the new fuse has been attached to the fuse accommodating portion is attached to the housing. Consequently, the fuse terminal and the terminal portion of the fuse are electrically connected to each other via the fuse elastic contact portion. In this manner, there is no need to perform an operation of removing a screw portion and a nut, and an operation of screwing a screw portion and a nut to each other after replacing the fuse. Accordingly, it is possible to improve the efficiency of an operation of replacing the fuse.

(2) It is preferable that the terminal portion is provided on an outer surface of the fuse, and the fuse elastic contact portion of the fuse terminal is configured to be elastically fitted onto the terminal portion.

Since it is possible to electrically connect the fuse and the fuse terminal to each other by bringing them into elastic contact with each other, the efficiency of the operation of replacing the fuse is improved.

(3) It is preferable that the terminal portion of the fuse includes a tab portion having a plate shape, the fuse terminal includes a fuse tube portion into which the tab portion is to be inserted, and the fuse tube portion includes a fuse elastic contact portion configured to protrude into the fuse tube portion so as to come into elastic contact with the tab portion inserted in the fuse tube portion.

Since it is possible to electrically connect the fuse and the fuse terminal to each other by bringing them into elastic contact with each other, the efficiency of the operation of replacing the fuse is improved.

(4) It is preferable that a relay terminal is attached to the housing, the holder includes a bus bar accommodating portion in which a bus bar configured to be electrically connected to the relay terminal is to be accommodated, the relay terminal includes a bus bar tube portion in which the bus bar is to be accommodated, and the bus bar tube portion includes a bus bar elastic contact portion configured to protrude into the bus bar tube portion so as to come into elastic contact with the bus bar inserted in the bus bar tube portion.

A circuit in which fuses are connected in series, and a circuit in which bus bars are connected in series can be formed using one fuse-equipped connector.

(5) The present disclosure relates to a connector structure including the fuse-equipped connector according to any one of (1) to (4) above; and a counterpart connector configured to be fitted to the fuse-equipped connector, wherein the counterpart connector includes a counterpart terminal configured to be electrically connected to the terminal portion of the fuse, and the counterpart terminal includes a counterpart fuse elastic contact portion configured to come into elastic contact with the terminal portion of the fuse.

When the counterpart connector and the fuse-equipped connector are disengaged from each other, the electrical connection between the counterpart fuse elastic contact portion of the counterpart terminal and the terminal portion of the fuse is disconnected. In this manner, there is no need to use a screw portion and a nut when electrically connecting the counterpart terminal and the terminal portion of the fuse to each other. Accordingly, it is possible to improve the efficiency of the operation of replacing the fuse.

(6) It is preferable that the housing of the fuse-equipped connector includes a window portion from which the holder mounted to the housing is exposed, and the fuse attached to the holder is exposed from the window portion, and the counterpart connector includes a hood portion configured to cover the fuse so as to close the window portion in a state in which the fuse-equipped connector and the counterpart connector are fitted to each other.

Since the fuse can be viewed from the window portion, it is possible to easily confirm whether or not the replacement of the fuse has been completed. This makes it possible to improve the efficiency of the operation of replacing the fuse. In addition, when the fuse-equipped connector and the counterpart connector are fitted to each other, the window portion is closed by the hood portion. Accordingly, it is possible to prevent a foreign object from entering the inside of the connector structure from the window portion.

DETAILS OF EMBODIMENTS OF THE PRESENT DISCLOSURE

Hereinafter, embodiments of the present disclosure will be described. It should be noted that the present disclosure is not limited to these examples, but is defined by the claims, and is intended to include all modifications which fall within the scope of the claims and the meaning and scope of equivalents thereof.

Embodiment 1

Figure 2:
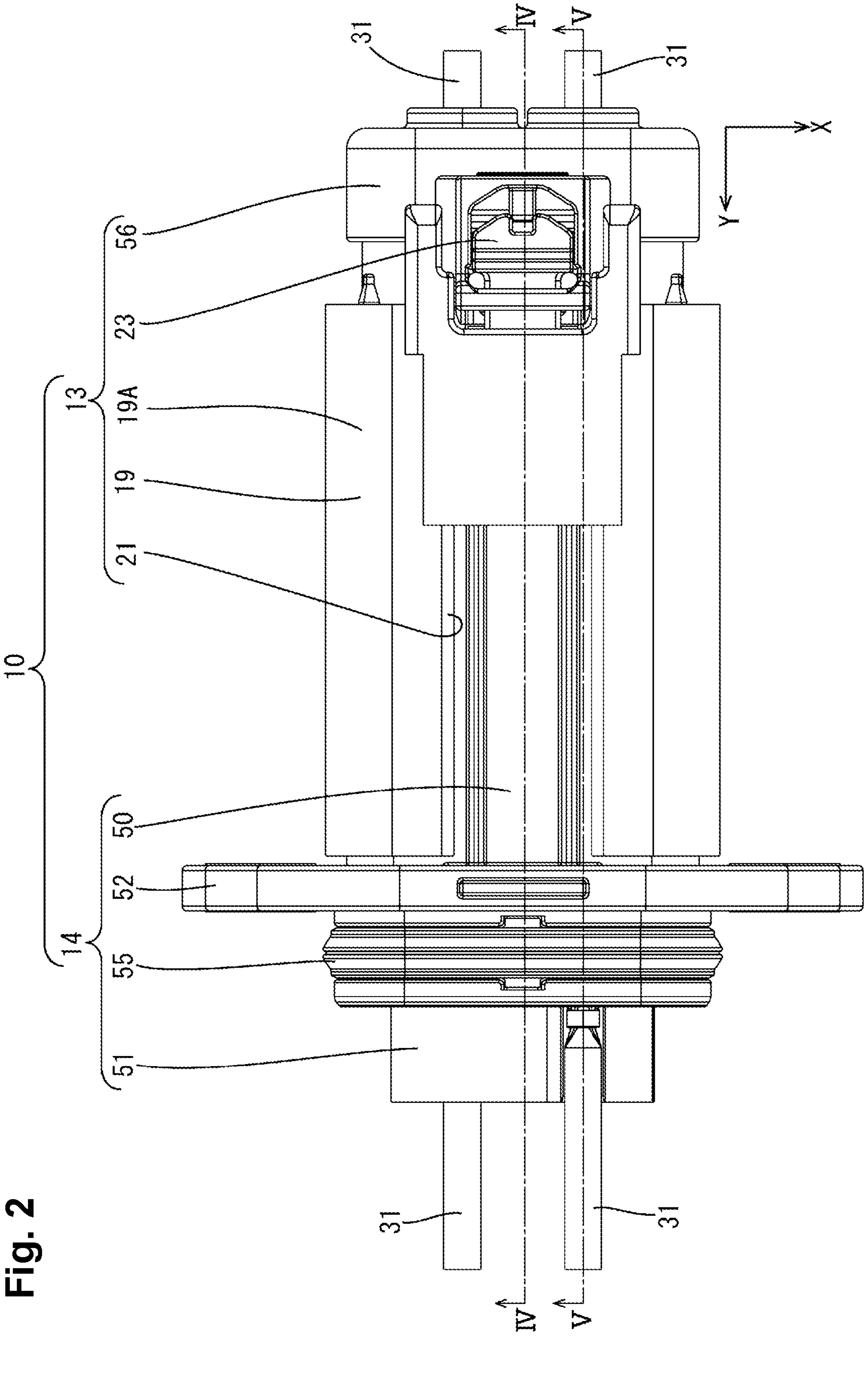
FIG. 2 is a plan view showing the connector structure.

Embodiment 1 of the present disclosure will be described with reference to FIGS. 1 to 7. In use, a connector structure 10 according to the present embodiment is attached to a device 11 such as a battery pack of a vehicle (not shown) such as an electric automobile. As shown in FIGS. 1 and 2, the connector structure 10 includes a fuse-equipped connector 13 including a fuse 12, and a counterpart connector 14 configured to be fitted to the fuse-equipped connector 13. The counterpart connector 14 is attached to the device 11. For the sake of convenience of description, the following description will be given assuming that the direction indicated by the arrow Z is the upward direction, the direction indicated by the arrow Y is the forward direction, and the direction indicated by the arrow X is the leftward direction. For a plurality of identical members, reference numerals may be assigned to some of the members, and reference numerals may be omitted for the other members.

Fuse-Equipped Connector 13

Figure 3:
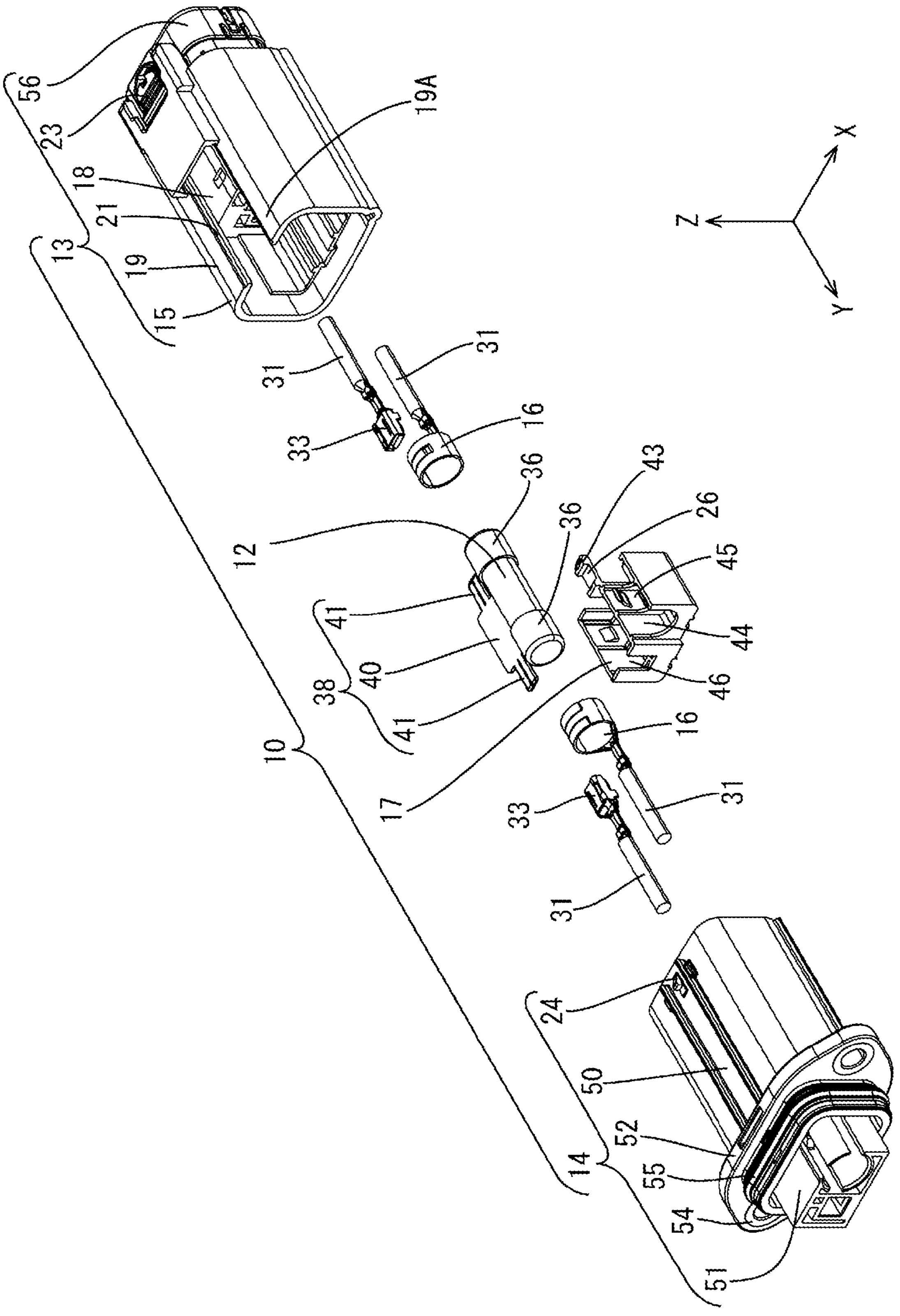
FIG. 3 is an exploded perspective view showing the connector structure.

As shown in FIG. 3, the fuse-equipped connector 13 includes a housing 15, at least one terminal 16 configured to be attached to the housing 15, a holder 17 configured to be attached to the housing 15, and a fuse 12 configured to be attached to the holder 17, and be electrically connected to the fuse terminal 16. Two wires 31 are drawn rearward from a rear end portion of the fuse-equipped connector 13 (see FIG. 2).

Housing 15

Figure 4:
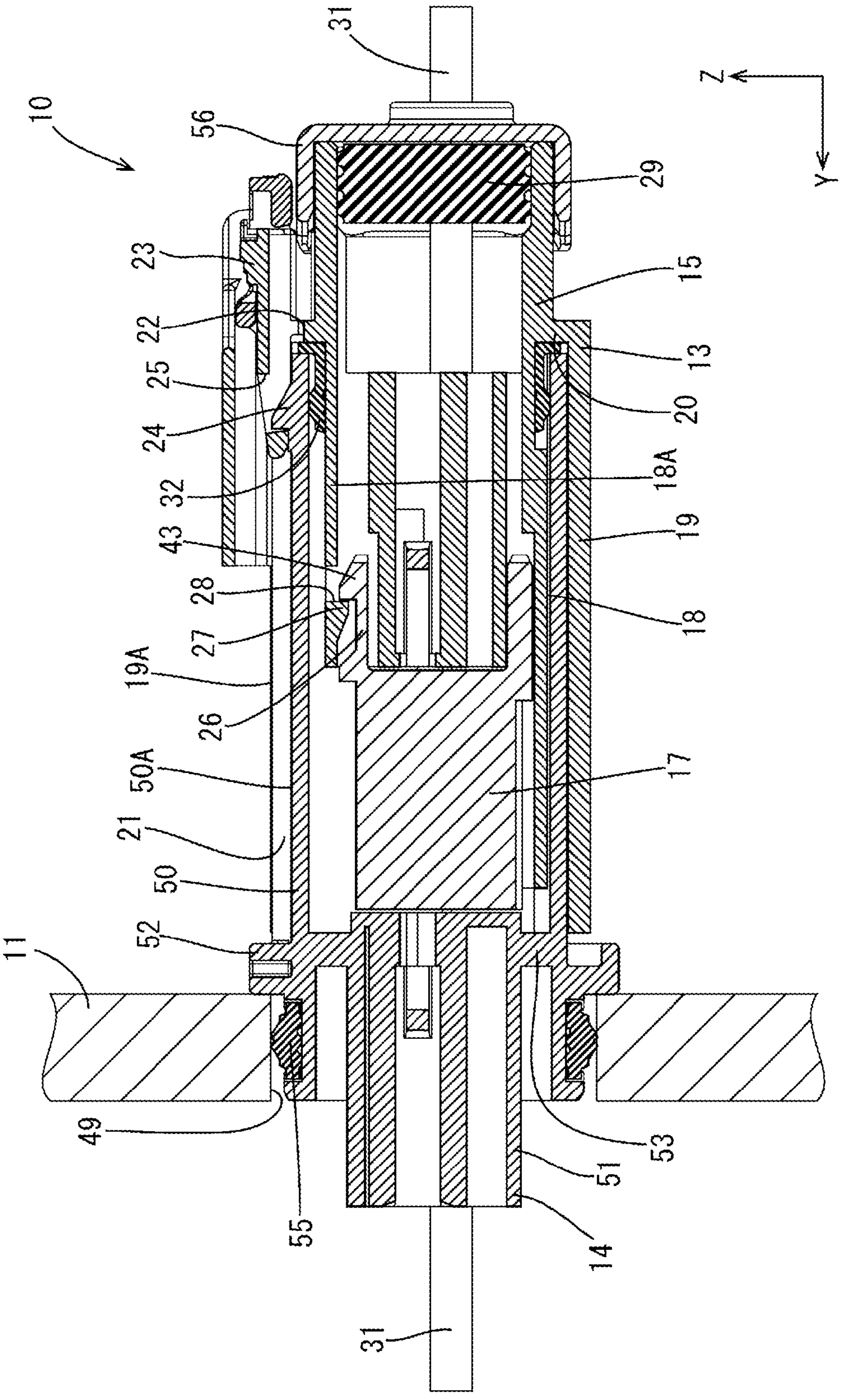
FIG. 4 is a cross-sectional view taken along the line IV-IV in FIG. 2.

The housing 15 is formed by injection molding an insulating synthetic resin. As shown in FIG. 4, the housing 15 has a tubular shape that is open forward and rearward. The housing 15 includes an inner tube portion 18 located inward in the radial direction of the housing 15, and an outer tube portion 19 located outward in the radial direction of the housing 15. The inner tube portion 18 and the outer tube portion 19 are coupled by a coupling portion 20 extending in the radial direction of the housing 15.

As shown in FIG. 3, a window portion 21 is formed in an upper wall 19A of the outer tube portion 19 so as to be cut out rearward from a front end portion of the upper wall 19A. The interior of the housing 15 is exposed from the window portion 21.

As shown in FIG. 4, an arm base portion 22 protruding upward is provided on an upper wall 18A of the inner tube portion 18 at a position located toward a rear end portion of the upper wall 18A, and a lock arm 23 is formed at an upper end of the arm base portion 22 so as to extend forward and rearward. The lock arm 23 is formed so as to be capable of swinging vertically, using the arm base portion 22 as a fulcrum. A locking hole 25 to which a lock projection 24, which will be described below, of the counterpart connector 14 is to be locked extends vertically through a portion of the lock arm 23 that is located toward the front end thereof.

As shown in FIG. 4, a lock portion 27 with which a lock receiving portion 26, which will be described below, of the holder 17 is to be elastically engaged is formed on the upper wall 18A of the inner tube portion 18 at a position located toward a front end portion of the upper wall 18A so as to protrude inward of the inner tube portion 18. A through hole 28 extending vertically through the upper wall 18A of the inner tube portion 18 is formed rearward of the lock portion 27.

Waterproofing Rubber Stopper 29

Figure 5:
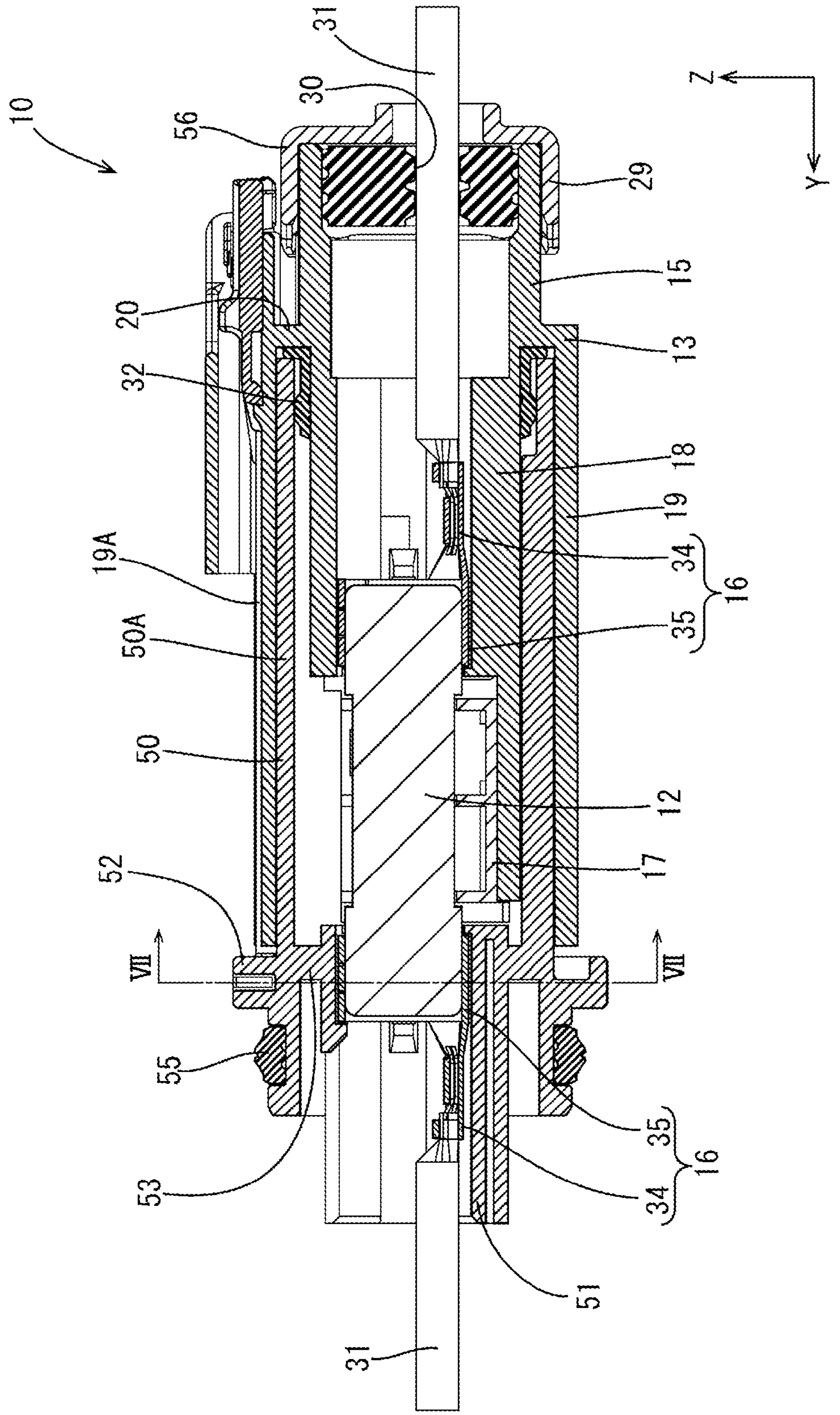
FIG. 5 is a cross-sectional view taken along the line V-V in FIG. 2.

As shown in FIG. 5, a waterproofing rubber stopper 29 made of rubber is fitted in a rear end portion of the inner tube portion 18. An outer surface of the waterproofing rubber stopper 29 and an inner surface of the rear end portion of the inner tube portion 18 come into close contact with each other, whereby the housing 15 and the waterproofing rubber stopper 29 are sealed in a liquid-tight manner. A rubber stopper holder 56 is fitted onto the rear end portion inner tube portion 18. Thus, the waterproofing rubber stopper 29 is held relative to the inner tube portion 18 while being prevented from coming off rearward.

As shown in FIG. 5, the waterproofing rubber stopper 29 has a wire insertion hole 30 extending therethrough in the front-rear direction. Although not shown in detail, in the present embodiment, the waterproofing rubber stopper 29 has two wire insertion holes 30 arranged side by side in a lateral direction. While the wires 31 are passed through the respective wire insertion holes 30, the outer surface of each of the wires 31 and the inner surface of the corresponding wire insertion hole 30 come into close contact with each other, whereby the wires 31 and the respective waterproofing rubber stoppers 29 are sealed in a liquid-tight manner.

Sealing Member 32

As shown in FIG. 5, a sealing member 32 made of rubber is fitted onto a rear end portion of the inner tube portion 18. The sealing member 32 has a generally ring shape. The sealing member 32 is attached forward of a coupling portion 20 that couples the inner tube portion 18 and the outer tube portion 19.

Fuse Terminal 16

Figure 6:
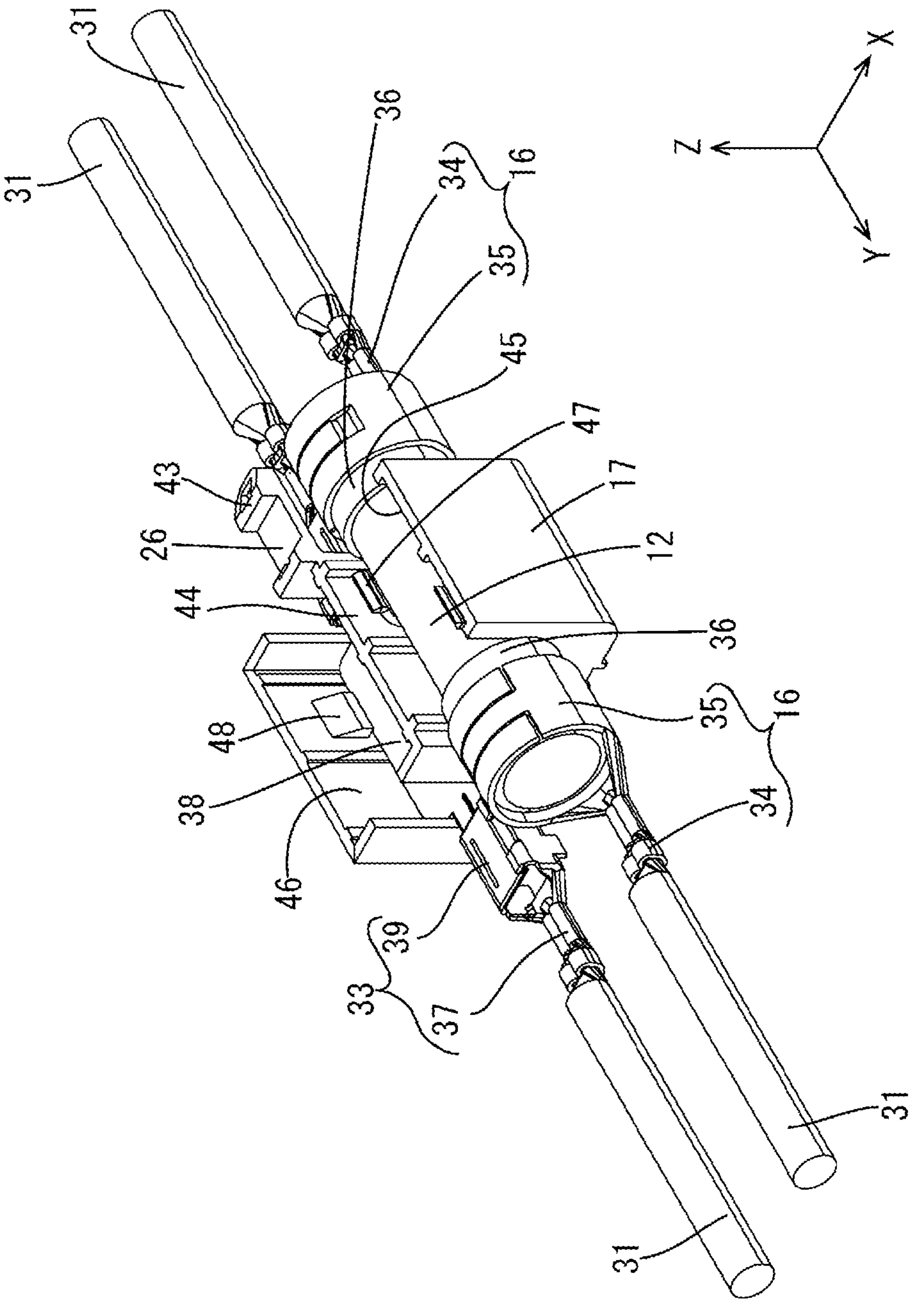
FIG. 6 is a partially enlarged perspective view showing a configuration in which a fuse is accommodated in a holder.

As shown in FIG. 6, a fuse terminal 16 is connected to a front end portion of one of the two wires 31 that is disposed on the left side, and a bus bar terminal 33 is connected to a front end portion of the wire 31 disposed on the right side. The fuse terminal 16 includes a wire connection portion 34 crimped to a front end portion of the wire 31, and a fuse elastic contact portion 35 that extends forward from the wire connection portion 34 and that is configured to be electrically connected to the fuse 12. The fuse terminal 16 is formed by pressing a metal plate material into a predetermined shape.

The fuse terminal 16 is attached inside the inner tube portion 18 by a known method such as using a lance. As a result of the wire connection portion 34 being crimped to the outer circumference of the wire 31, the wire 31 and the fuse terminal 16 are electrically connected to each other.

As shown in FIG. 3, the fuse 12 has an overall columnar shape extending in the front-rear direction. Conductive terminal portions 36 are provided in a ring shape at the front end portion and the rear end portion, respectively, of the fuse 12.

As shown in FIG. 6, the fuse elastic contact portion 35 is formed by forming a metal plate material into a ring shape. The fuse elastic contact portion 35 is formed such that its diameter can be enlarged. The inner diameter of the fuse elastic contact portion 35 in a natural state is set to be smaller than the outer diameter of the terminal portion 36 of the fuse 12, which will be described below. The fuse elastic contact portion 35 is configured to be elastically deformed such that its diameter is enlarged in a state in which the fuse elastic contact portion 35 is fitted onto the terminal portion 36 of the fuse 12, whereby elastic force is exerted radially inward of the fuse elastic contact portion 35. Thus, the fuse elastic contact portion 35 is configured to come into elastic contact with the terminal portion 36 of the fuse 12.

Bus Bar Terminal 33

As shown in FIG. 6, the bus bar terminal 33 includes a wire connection portion 37 crimped to a front end portion of the wire 31, and a bus bar tube portion 39 that extends forward from the wire connection portion 37 and in which a bus bar 38 described below is to be accommodated. The bus bar terminal 33 is formed by pressing a metal plate material into a predetermined shape.

The bus bar terminal 33 is attached inside the inner tube portion 18 by a known method such as using a lance. As a result of the wire connection portion 37 being crimped to the outer circumference of the wire 31, the wire 31 and the bus bar terminal 33 are electrically connected to each other.

The bus bar 38 is formed by pressing a metal plate material into a predetermined shape. The bus bar 38 includes a main body portion 40 having a rectangular shape as viewed from above, and tabs 41 protruding forward and rearward, respectively, from a front end and a rear end, respectively, of the main body portion 40. The width in the lateral direction of each tab 41 is set to be smaller than the width in the lateral direction of the main body portion 40.

The bus bar tube portion 39 is formed in a rectangular tubular shape extending in the front-rear direction. An elastically deformable bus bar elastic contact portion 42 is formed inside the bus bar tube portion 39 so as to protrude inward of the bus bar tube portion 39. When a tab 41 of the bus bar 38 is inserted into the bus bar tube portion 39 from the front, the bus bar elastic contact portion 42 comes into elastic contact with the tab 41. Thus, the bus bar 38 and the bus bar terminal 33 are configured to be electrically connected to each other (see FIG. 7).

Holder 17

As shown in FIG. 6, a holder 17 formed by injection molding an insulating synthetic resin is attached inside the housing 15. A lock receiving portion 26 extending reward is formed at a rear end portion of the holder 17. The lock receiving portion 26 is formed in a plate shape extending in the front-rear direction. A protrusion 43 protruding upward is formed on an upper surface of the lock receiving portion 26 at a position located toward a rear end portion of the upper surface. As a result of the protrusion 43 coming into contact with the lock portion 27 from the rear, the holder 17 is held relative to the housing 15 while being prevented from coming off forward. The protrusion 43 is configured to be exposed from the through hole 28 formed in the inner tube portion 18 in a state in which the lock portion 27 and the lock receiving portion 26 are engaged with each other.

The holder 17 is generally formed in a box shape that is open upward. The holder 17 has a partitioning wall 44 formed in the vicinity of a laterally central portion so as to extend in the front-rear direction. As a result of the holder 17 being divided by the partitioning wall 44, a fuse accommodating portion 45 in which the fuse 12 is to be accommodated is formed on the left side of the holder 17, and a bus bar accommodating portion 46 in which the bus bar 38 is to be accommodated is formed on the left side of the holder 17.

The length in the front-rear direction of the fuse accommodating portion 45 is set to be the same as, or slightly smaller than the length in the front-rear direction of a region of the fuse 12 that is sandwiched between the two terminal portions 36. Thus, when the fuse 12 is mounted to the fuse accommodating portion 45 from above, the terminal portions 36 of the fuse 12 protrude forward and rearward, respectively, from the front end and the rear end, respectively, of the fuse accommodating portion 45. The fuse accommodating portion 45 is provided with a fuse locking portion 47 configured to be locked, from above, to the region of the fuse 12 that is sandwiched between the two terminal portions 36, and hold the fuse 12 so as to prevent the fuse from coming off upward.

The length in the front-rear direction of the bus bar accommodating portion 46 is set to be the same as, or slightly smaller than the length in the front-rear direction of the main body portion 40 of the bus bar 38. Thus, when the bus bar 38 is mounted to the bus bar accommodating portion

46 from above, the tabs 41 of the bus bar 38 protrude forward and rearward, respectively, from the front end and the rear end, respectively, of the bus bar accommodating portion 46. The bus bar accommodating portion 46 is provided with a bus bar locking portion 48 configured to be locked to the main body portion 40 of the bus bar 38 from above, and hold the bus bar 38 so as to prevent the bus bar 38 from coming off upward.

In a state in which the holder 17 is attached to the housing 15, the fuse 12 held in the holder 17 is exposed from the window portion 21 formed in the outer tube portion 19. This allows the fuse 12 to be viewed from above through the window portion 21.

Counterpart Connector 14

As shown in FIG. 4, the counterpart connector 14 is configured to be attached to the device 11. The device 11 has an attachment hole 49 extending therethrough in the front-rear direction. The counterpart connector 14 is to be inserted into the attachment hole 49 from the rear.

As shown in FIG. 4, the counterpart connector 14 is formed by injection molding an insulating synthetic resin. The counterpart connector 14 includes a hood portion 50 having a tubular shape that is open forward and rearward, a tower portion 51 provided radially inward of the hood portion 50, and a flange 52 extending radially outward of the hood portion 50 from a position located toward a front end portion of the hood portion 50. The hood portion 50 and the tower portion 51 are coupled by a coupling portion 53 extending in the radial direction of the hood portion 50.

As shown in FIG. 4, a lock projection 24 protruding upward is formed on an upper surface 50A of the hood portion 50 at a position located toward a front end portion of the upper surface 50A. The lock projection 24 comes into contact with an edge portion of the locking hole 25 of the lock arm 23 from the rear, whereby the counterpart connector 14 and the fuse-equipped connector 13 are held while being prevented from coming off.

Figure 7:
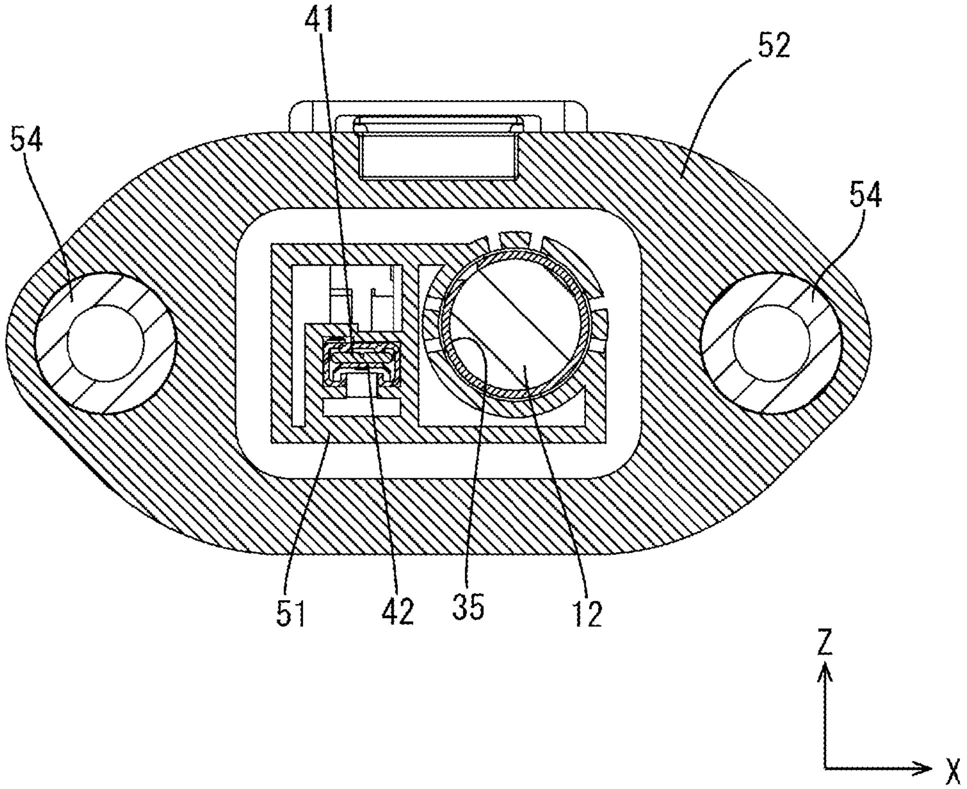
FIG. 7 is a cross-sectional view taken along the line VII-VII in FIG. 5.

As shown in FIG. 7, collars 54 made of metal are respectively embedded in a left end portion and a right end portion, respectively, of the flange 52. Each collar 54 has a cylindrical shape extending in the front-rear direction. A bolt (not shown) is passed through the collar 54, and the bolt is screwed to the device 11, whereby the counterpart connector 14 is fixed to the device 11.

As shown in FIG. 4, a sealing ring 55 made of rubber is fitted onto a front end portion of the hood portion 50. The front end portion of the hood portion 50 is configured to be inserted into the attachment hole 49 described above. An outer surface of the sealing ring 55 is configured to be in close contact with an inner surface of the attachment hole 49 in a state in which the counterpart connector 14 is attached to the device 11. Thus, the counterpart connector 14 and the device 11 are configured to be sealed in a liquid-tight manner.

As shown in FIG. 5, the hood portion 50 of the counterpart connector 14 is configured to be inserted, from the front, into a space between the outer tube portion 19 and the inner tube portion 18 of the fuse-equipped connector 13. The inner surface of the hood portion 50 and the outer surface of the sealing member 32 fitted onto the inner tube portion 18 are configured to be in close contact with each other in a state in which the hood portion 50 is inserted between the outer tube portion 19 and the inner tube portion 18. Thus, the space between the counterpart connector 14 and the fuse-equipped connector 13 are configured to be sealed in a liquid-tight manner.

As shown in FIG. 4, the window portion 21 formed in the outer tube portion 19 is configured to be closed by the hood portion 50 from below in a state in which the counterpart connector 14 and the fuse-equipped connector 13 are fitted to each other. In addition, the hood portion 50 is configured to cover the fuse 12 from above the holder 17.

The fuse terminal 16 configured to be electrically connected to the fuse 12, and the bus bar terminal 33 configured to be electrically connected to the bus bar 38 are accommodated in the tower portion 51. The fuse terminal 16 and the bus bar terminal 33 are configured to be held inside the tower portion 51 by a known method such as using a lance. The fuse terminal 16 is accommodated on the left side of the tower portion 51, and the bus bar terminal 33 is accommodated on the right side of the tower portion 51. The fuse terminal 16 and the bus bar terminal 33 are connected to the rear end portions of the respective corresponding wires 31. Two wires 31 are drawn forward from the front end portion of the tower portion 51.

The fuse terminal 16 and the bus bar terminal 33 that are accommodated in the tower portion 51 have the same configurations as the fuse terminal 16 and the bus bar terminal 33 that are accommodated in the fuse-equipped connector 13. Therefore, the same components are denoted by the same reference numerals, and descriptions thereof have been omitted.

Mounting of Connector Structure 10

Next, an example of a process of mounting the connector structure 10 will be described. The process of mounting the connector structure 10 is not limited to the following description.

The waterproofing rubber stopper 29 is fitted, from the rear, into the inner tube portion 18 formed in the housing 15 of the fuse-equipped connector 13. In addition, the sealing member 32 is fitted onto the inner tube portion 18 of the housing 15 from the front.

The fuse terminal 16 is connected to a front end portion of one wire 31, and the bus bar terminal 33 is connected to a front end portion of the other wire 31. The fuse terminal 16 and the bus bar terminal 33 are passed through the wire insertion hole 30 of the waterproofing rubber stopper 29 from the rear, and are attached to the inner tube portion 18 of the housing 15. The rubber stopper holder 56 is fitted onto a rear end portion of the inner tube portion 18 of the housing 15.

The fuse 12 is accommodated in the fuse accommodating portion 45 of the holder 17 from above. In addition, the bus bar 38 is accommodated in the bus bar accommodating portion 46 of the holder 17 from above.

The holder 17 is attached to the housing 15 from the front. The protrusion 43 provided on the lock receiving portion 26 of the holder 17 comes into contact with the lock portion 27 of the inner tube portion 18 from the front. Then, the lock receiving portion 26 is deformed so as to be bent downward. When the holder 17 is further pushed rearward, the lock receiving portion 26 returns into its original state, and the protrusion 43 of the lock receiving portion 26 comes into contact with the lock portion 27 from the rear, whereby the holder 17 is held relative to the housing 15 while being prevented from coming off forward.

The fuse elastic contact portion 35 of the fuse terminal 16 is configured to be fitted onto the terminal portion 36 of the fuse 12 in a state in which the holder 17 is held relative to the housing 15. The fuse elastic contact portion 35 is deformed such that its diameter is enlarged in the radial direction of the fuse elastic contact portion 35, thereby coming into contact with the terminal portion 36 of the fuse

12 by its elastic force. Thus, the fuse 12 and the fuse terminal 16 are electrically connected to each other.

Each tab 41 of the bus bar 38 is configured to be inserted into the corresponding bus bar tube portion 39 of the bus bar terminal 33 in a state in which the holder 17 is held relative to the housing 15. When the tab 41 of the bus bar 38 is inserted into the bus bar tube portion 39, the bus bar elastic contact portion 42 comes into elastic contact with the tab 41. Thus, the bus bar 38 and the bus bar terminal 33 are electrically connected to each other. Accordingly, the fuse-equipped connector 13 is completed.

The fuse terminal 16 is connected to a rear end portion of one wire 31, and the bus bar terminal 33 is connected to a rear end portion of the other wire 31. The fuse terminal 16 and the bus bar terminal 33 are attached to the tower portion 51 of the counterpart connector 14. The sealing ring 55 is fitted onto the hood portion 50 at a position located toward a front end portion of the hood portion 50.

The front end portion of the hood portion 50 is insert into the attachment hole 49 of the device 11 from the rear. A bolt (not shown) is passed through each of the collars 54 of the flange 52, and the device 11 and the counterpart connector 14 are fixed to each other using the bolts.

The fuse-equipped connector 13 is moved from the rear toward the counterpart connector 14 fixed to the device 11 such that the hood portion 50 of the counterpart connector 14 is inserted between the inner tube portion 18 and the outer tube portion 19 of the fuse-equipped connector 13. The lock projection 24 formed on the upper surface 50A of the hood portion 50 comes into contact with the front end portion of the lock arm 23 from the front. Then, the lock arm 23 swings such that a front end portion of the lock arm 23 moves upward using the arm base portion 22 as a fulcrum, and a rear end portion of the lock arm 23 moves downward.

When the counterpart connector 14 and the fuse-equipped connector 13 are further moved toward each other, the lock arm 23 returns into its original state, and the lock projection 24 of the counterpart connector 14 enters the inside of the locking hole 25 of the lock arm 23. As a result of the lock projection 24 coming into contact with an edge portion of the locking hole 25 from the rear, the counterpart connector 14 and the fuse-equipped connector 13 are held while being prevented from coming off in the front-rear direction. Thus, a connector structure 10 is completed.

Operation of Replacing Fuse 12

Next, an example of an operation of replacing the fuse 12 will be described. The operation of replacing the fuse 12 is not limited to the following description.

By pushing the rear end portion of the lock arm 23 downward, the lock arm 23 is caused to swing using the arm base portion 22 as a fulcrum. Thus, the front end portion of the lock arm 23 moves upward. As a result, the lock projection 24 and the edge portion of the locking hole 25 are disengaged from each other. In this state, the fuse-equipped connector 13 is pulled out rearward.

After the fuse-equipped connector 13 has been detached from the counterpart connector 14, the protrusion 43 exposed from the through hole 28 of the inner tube portion 18 is pushed downward using a jig (not shown). Consequently, the lock portion 27 and the lock receiving portion 26 are disengaged from each other. In this state, the holder 17 is detached from the housing 15.

The fuse 12 is removed from the holder 17 that has been detached from the housing 15. Then, a new fuse 12 is mounted to the holder 17.

Thereafter, after the holder 17 has been mounted to the housing 15, the fuse-equipped connector 13 is fitted to the counterpart connector 14.

Operations and Effects of the Present Embodiment

Next, operations and effects of the present embodiment will be described. A fuse-equipped connector 13 according to the present embodiment includes: a housing 15; a fuse terminal 16 configured to be attached to the housing 15; a holder 17 configured to be attached to the housing 15; and a fuse 12 configured to be attached to the holder 17, and be electrically connected to the fuse terminal 16, wherein the housing 15 includes a lock portion 27, and the holder 17 includes a lock receiving portion 26 configured to be elastically locked to the lock portion 27, the holder 17 includes a fuse accommodating portion 45 in which the fuse 12 is to be removably accommodated, the fuse 12 includes a terminal portion 36, and the fuse terminal 16 includes a fuse elastic contact portion 35 configured to come into elastic contact with the terminal portion 36 of the fuse 12.

The lock portion 27 and the lock receiving portion 26 are disengaged from each other to separate the housing 15 and the holder 17 from each other. Consequently, the fuse elastic contact portion 35 of the fuse terminal 16 is separated from the terminal portion 36 of the fuse 12, whereby the electrical connection between the fuse terminal 16 and the fuse 12 is disconnected. The fuse 12 is removed from the fuse accommodating portion 45 of the holder 17, and is replaced with a new fuse 12. The holder 17 in which the new fuse 12 has been attached to the fuse accommodating portion 45 is attached to the housing 15. Consequently, the fuse terminal 16 and the terminal portion 36 of the fuse 12 are electrically connected to each other via the fuse elastic contact portion 35. In this manner, there is no need to perform an operation of removing a screw portion and a nut, and an operation of screwing a screw portion and a nut to each other after replacing the fuse 12. Accordingly, it is possible to improve the efficiency of an operation of replacing the fuse 12.

According to the present embodiment, the terminal portion 36 is provided on an outer surface of the fuse 12, and the fuse elastic contact portion 35 of the fuse terminal 16 is configured to be elastically fitted onto the terminal portion 36.

Since it is possible to electrically connect the fuse 12 and the fuse terminal 16 to each other by bringing them into elastic contact with each other, the efficiency of the operation of replacing the fuse 12 is improved.

According to the present embodiment, a bus bar terminal 33 is attached to the housing 15, the holder 17 includes a bus bar accommodating portion 46 in which a bus bar 38 configured to be electrically connected to the bus bar terminal 33 is to be accommodated, the bus bar terminal 33 includes a bus bar tube portion 39 in which the bus bar 38 is to be accommodated, and the bus bar tube portion 39 includes a bus bar elastic contact portion 42 configured to protrude into the bus bar tube portion 39 so as to come into elastic contact with the bus bar 38 inserted in the bus bar tube portion 39.

A circuit in which fuses 12 are connected in series, and a circuit in which bus bars 38 are connected in series can be formed using one fuse-equipped connector 13.

According to the present embodiment, the connector structure includes: the fuse-equipped connector 13; and a counterpart connector 14 configured to be fitted to the fuse-equipped connector 13, wherein the counterpart connector 14 includes a fuse terminal 16 configured to be electrically connected to the terminal portion 36 of the fuse 12, and the fuse terminal 16 includes a fuse elastic contact portion 35 configured to come into elastic contact with the terminal portion 36 of the fuse 12.

When the counterpart connector 14 and the fuse-equipped connector 13 are disengaged from each other, the electrical connection between the fuse elastic contact portion 35 of the fuse terminal 16 and the terminal portion 36 of the fuse 12 is disconnected. In this manner, there is no need to use a screw portion and a nut when electrically connecting the fuse terminal 16 and the terminal portion 36 of the fuse 12 to each other. Accordingly, it is possible to improve the efficiency of the operation of replacing the fuse 12.

According to the present embodiment, the housing 15 of the fuse-equipped connector 13 includes a window portion 21 from which the holder 17 mounted to the housing 15 is exposed, and the fuse 12 attached to the holder 17 is exposed from the window portion 21, and the counterpart connector 14 includes a hood portion 50 configured to cover the fuse 12 so as to close the window portion 21 in a state in which the fuse-equipped connector 13 and the counterpart connector 14 are fitted to each other.

The fuse 12 can be viewed from the window portion 21 in a state in which the fuse-equipped connector 13 and the counterpart connector 14 are separated from each other. Accordingly, it is possible to easily confirm whether or not the replacement of the fuse 12 has been completed. This makes it possible to improve the efficiency of the operation of replacing the fuse 12. In addition, when the fuse-equipped connector 13 and the counterpart connector 14 are fitted to each other, the window portion 21 is closed by the hood portion 50. Accordingly, it is possible to prevent a foreign object from entering the inside of the connector structure 10 from the window portion 21.

Embodiment 2

Figure 8:
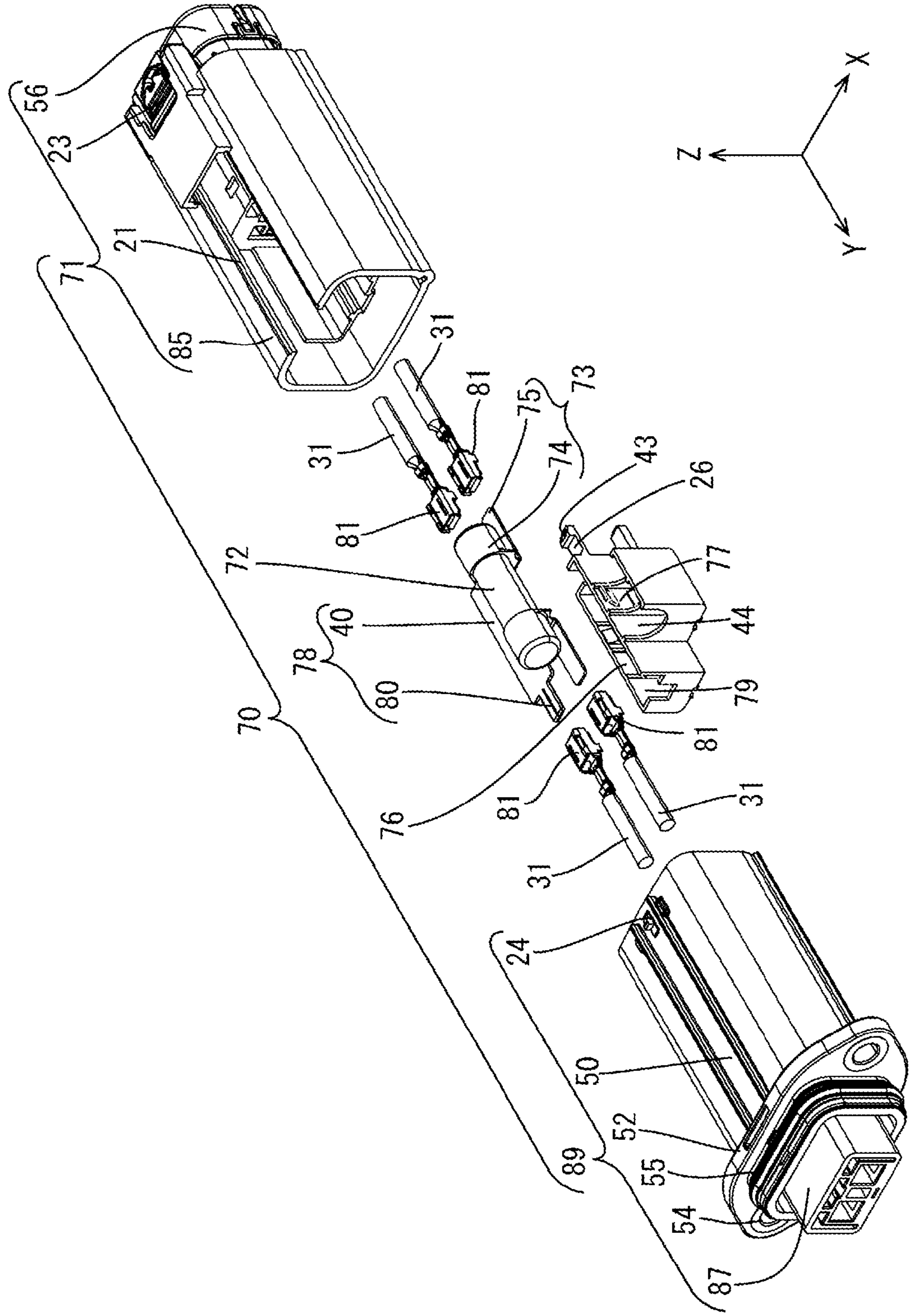
FIG. 8 is an exploded perspective view showing a connector structure according to Embodiment 2.
Figure 9:
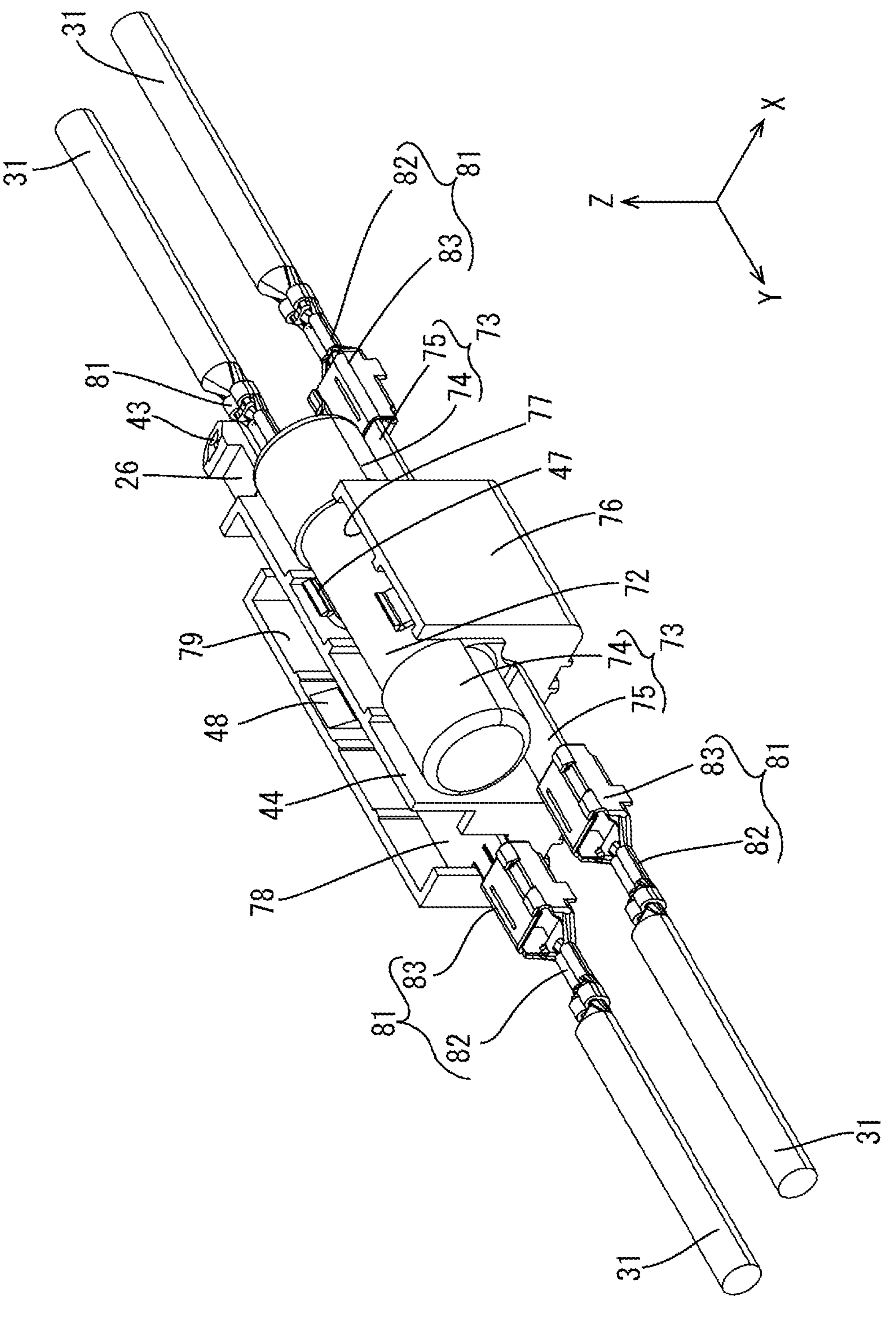
FIG. 9 is a partially enlarged perspective view showing a configuration in which a fuse is accommodated in a holder.

Next, Embodiment 2 of the present disclosure will be described with reference to FIGS. 8 to 10. As shown in FIGS. 8 and 9, in a connector structure 10 according to the present embodiment, a terminal portion 73 of a fuse 72 attached to a fuse-equipped connector 71 includes a ring shaped, external fitting portion 74 attached to an outer surface of the fuse 72, and a plate-shaped tab portion 75 extending downward from a lower end of the external fitting portion 74 and extending forward or rearward in a direction away from the fuse 72. A distal end portion of the tab portion 75 extends protruding outward of the external fitting portion 74 of the fuse 72 in the front-rear direction.

As shown in FIG. 8, a fuse accommodating portion 77 in which the fuse 72 is to be accommodated is provided on the left side of the holder 76, and a bus bar accommodating portion 79 in which a bus bar 78 is to be accommodated is provided on the right side of the holder 76. In the present embodiment, the length in the front-rear direction of the fuse accommodating portion 77 is set to be shorter than the length in the front-rear direction of the bus bar accommodating portion 79.

As shown in FIG. 8, the width in the lateral direction of the tab portion 75 provided at the terminal portion 73 of the fuse 72 is set to be substantially the same as the width in the lateral direction of a tab 80 provided on the bus bar 78. In addition, the thickness in the vertical direction of the tab portion 75 provided at the terminal portion 73 of the fuse 72 is set to be substantially the same as the thickness in the vertical direction of the tab 80 provided on the bus bar 78.

As shown in FIGS. 8 and 9, in the present embodiment, a terminal 81 (an example of a fuse terminal) configured to be connected to the tab portion 75 provided at the terminal portion 73 of the fuse 72 has the same shape as that of a terminal 81 (an example of a bus bar terminal) configured to be connected to the bus bar 78. Accordingly, the terminal 81 configured to be connected to the fuse 72, and the terminal 81 configured to be connected to the bus bar 78 are denoted by the same reference numeral, and redundant descriptions thereof have been omitted.

Figure 10:
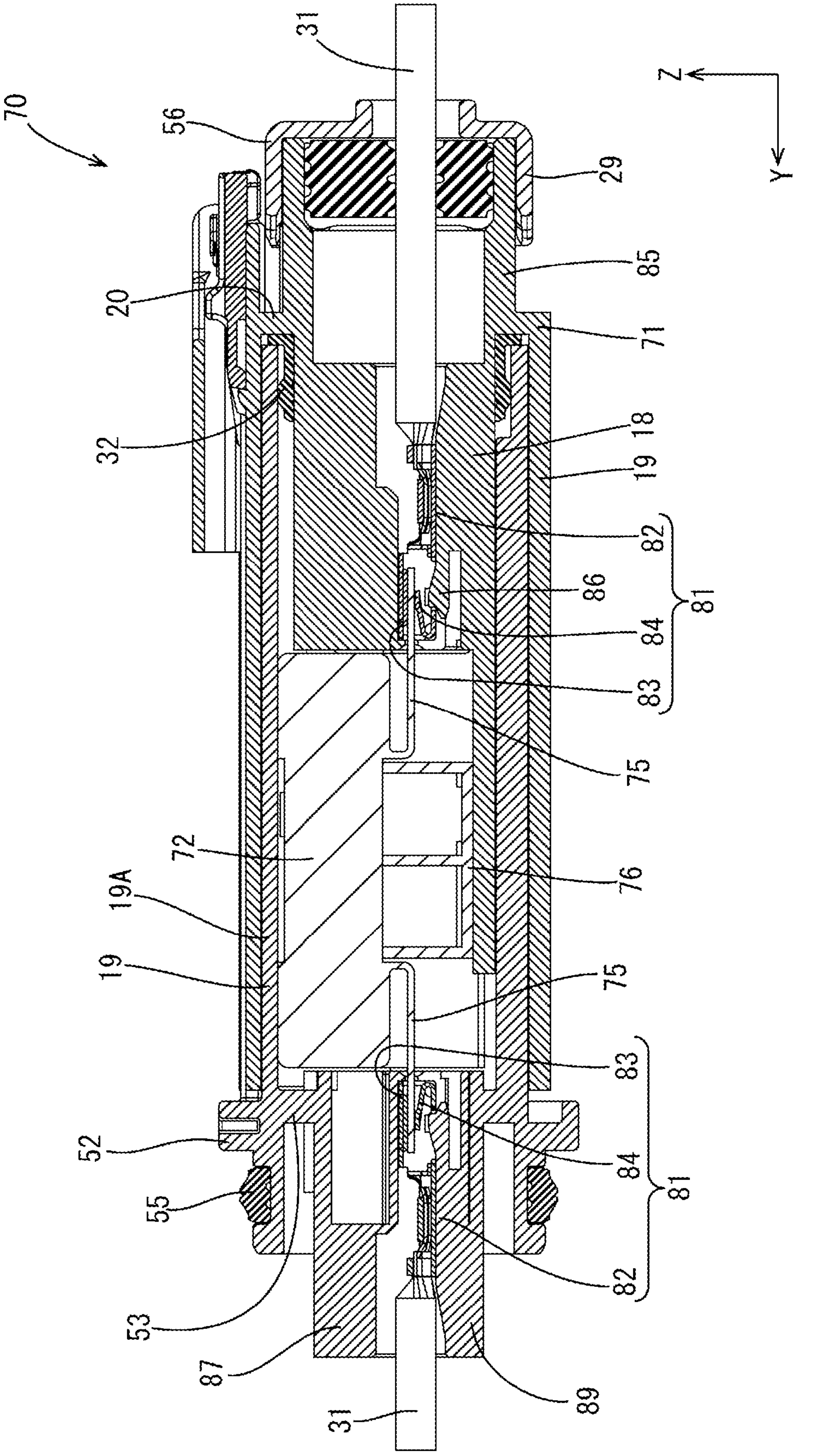
FIG. 10 is a cross-sectional view showing the connector structure.

As shown in FIG. 10, each terminal 81 includes a wire connection portion 82 configured to be crimped to an end portion of a wire 31, and a tube portion 83 (an example of a fuse tube portion, an example of a bus bar tube portion) extending from the wire connection portion 82. The tab portion 75 of the fuse 72, or the tab 80 of the bus bar 78 is to be inserted into the tube portion 83. An elastically deformable, elastic contact portion 84 (an example of a fuse elastic contact portion, an example of a bus bar elastic contact portion) is disposed inside the tube portion 83. The elastic contact portion 84 is configured to come into elastic contact with the tab portion 75 or the tab 80.

As shown in FIG. 10, the terminal 81 is accommodated in a housing 85 of the fuse-equipped connector 71. A lance 86 extending forward is provided inside the housing 85, and the tube portion 83 of the terminal 81 comes into contact with a front end portion of the lance 86 from the front, whereby the terminal 81 is held while being prevented from coming off rearward.

As shown in FIG. 10, a terminal 81 is accommodated in a tower portion 87 of a counterpart connector 89. A lance 88 extending rearward is provided inside the tower portion 87, and the tube portion 83 of the terminal 81 comes into contact with a rear end portion of the lance 88, whereby the terminal 81 is held while being prevented from coming off forward.

The rest of the configuration is substantially the same as that of Embodiment 1, and therefore the same members are denoted by the same reference numerals, and redundant descriptions thereof have been omitted.

According to the present embodiment, the terminal portion 73 of the fuse 72 includes the plate-shaped tab portion 75, the terminal 81 includes the tube portion 83 into which the tab portion 75 is to be inserted, and the tube portion 83 includes the elastic contact portion 84 configured to protrude into the tube portion 83 so as to come into elastic contact with the tab portion 75 inserted in the tube portion 83.

Since it is possible to electrically connect the fuse 72 and the terminal 81 to each other by bringing them into elastic contact with each other, the efficiency of an operation of replacing the fuse 72 is improved.

Other Embodiments (1) The number of wires 31 to be connected to the fuse-equipped connector 13 may be one, or three or more. The member to be connected to the fuse-equipped connector 13 is not limited to the wire 31, and any conductive member such as the bus bar 38 can be connected to the fuse-equipped connector 13.

(2) The number of wires 31 to be connected to the counterpart connector 14 may be one, or three or more. The member to be connected to the counterpart connector 14 is not limited to the wire 31, and any conductive member such as the bus bar 38 can be connected to the counterpart connector 14.

(3) It is possible to adopt a configuration in which the housing 15 does not include the window portion 21, and covers the outer periphery of the holder 17 such that the holder 17 is not exposed to the outside.

LIST OF REFERENCE NUMERALS

10, 70: Connector structure
11: Device
12, 72: Fuse
13, 71: Fuse-equipped connector
14, 89: Counterpart connector
15, 85: Housing
16: Fuse terminal
17, 76: Holder
18: Inner tube portion
18A: Upper wall
19: Outer tube portion
19A: Upper wall
20: Coupling portion
21: Window portion
22: Arm base portion
23: Lock arm
24: Lock projection
25: Locking hole
26: Lock receiving portion
27: Lock portion
28: Through hole
29: Waterproofing rubber stopper
30: Wire insertion hole
31: Wire
32: Sealing member
33: Bus bar terminal
34: Wire connection portion
35: Fuse elastic contact portion
36, 73: Terminal portion
37: Wire connection portion
38, 78: Bus bar
39: Bus bar tube portion
40: Main body portion
41, 80: Tab
42: Bus bar elastic contact portion
43: Protrusion
44: Partitioning wall
45, 77: Fuse accommodating portion
46, 79: Bus bar accommodating portion
47: Fuse locking portion
48: Bus bar locking portion
49: Attachment hole
50: Hood portion
50A: Upper surface
51: Tower portion
52: Flange
53: Coupling portion
54: Collar
55: Sealing ring
56: Rubber stopper holder
74: External fitting portion
75: Tab portion
81: Terminal
82: Wire connection portion
83: Tube portion
84: Elastic contact portion
86, 88: Lance
87: Tower portion

The invention claimed is:

1. A fuse-equipped connector comprising:
a housing;
a fuse terminal configured to be attached to the housing;
a holder configured to be attached to the housing; and
a fuse configured to be attached to the holder, and to be electrically connected to the fuse terminal,
wherein the housing includes a lock portion, and the holder includes a lock receiving portion configured to be elastically locked to the lock portion,
the holder includes a fuse accommodating portion in which the fuse is to be removably accommodated,
the fuse includes a terminal portion, and
the fuse terminal includes a fuse elastic contact portion configured to come into elastic contact with the terminal portion of the fuse,
a relay terminal is attached to the housing,
the holder includes a bus bar accommodating portion in which a bus bar configured to be electrically connected to the relay terminal is to be accommodated,
the relay terminal includes a bus bar tube portion in which the bus bar is to be accommodated, and
the bus bar tube portion includes a bus bar elastic contact portion configured to protrude into the bus bar tube portion so as to come into elastic contact with the bus bar inserted in the bus bar tube portion.

2. The fuse-equipped connector according to claim 1,
wherein the terminal portion is provided on an outer surface of the fuse, and
the fuse elastic contact portion of the fuse terminal is configured to be elastically fitted onto the terminal portion.

3. The fuse-equipped connector according to claim 1,
wherein the terminal portion of the fuse includes a tab portion having a plate shape,
the fuse terminal includes a fuse tube portion into which the tab portion is to be inserted, and
the fuse tube portion includes a fuse elastic contact portion configured to protrude into the fuse tube portion so as to come into elastic contact with the tab portion inserted in the fuse tube portion.

4. A connector structure comprising:
the fuse-equipped connector according to claim 1; and
a counterpart connector configured to be fitted to the fuse-equipped connector,
wherein the counterpart connector includes a counterpart terminal configured to be electrically connected to the terminal portion of the fuse, and
the counterpart terminal includes a counterpart fuse elastic contact portion configured to come into elastic contact with the terminal portion of the fuse.

5. A connector structure comprising:
a fuse-equipped connector; and
a counterpart connector configured to be fitted to the fuse-equipped connector,
wherein the fuse-equipped connector comprises:
a housing including a tubular circumferential wall that extends in a front-rear direction and an opening that opens forward and through which the counterpart connector is fitted into the housing of the fuse-equipped connector in the front-rear direction;
a fuse terminal configured to be attached to the housing;
a holder configured to be attached to the housing; and
a fuse configured to be attached to the holder, and to be electrically connected to the fuse terminal,
the housing includes a lock portion, and the holder includes a lock receiving portion configured to be elastically locked to the lock portion,
the holder includes a fuse accommodating portion in which the fuse is to be removably accommodated, the fuse includes a terminal portion, the fuse terminal includes a fuse elastic contact portion configured to come into elastic contact with the terminal portion of the fuse, the counterpart connector includes a counterpart terminal configured to be electrically connected to the terminal portion of the fuse, the counterpart terminal includes a counterpart fuse elastic contact portion configured to come into elastic contact with the terminal portion of the fuse, the housing of the fuse-equipped connector includes a window portion in the tubular circumferential wall, wherein the window portion opens upward in a direction different from the opening of the housing, and the holder mounted to the housing and the fuse attached to the holder are exposed from the window portion, and the counterpart connector includes a hood portion configured to cover the fuse so as to close the window portion in a state in which the fuse-equipped connector and the counterpart connector are fitted to each other.

6. The connector structure according to claim 5, wherein a relay terminal is attached to the housing, the holder includes a bus bar accommodating portion in which a bus bar configured to be electrically connected to the relay terminal is to be accommodated, the relay terminal includes a bus bar tube portion in which the bus bar is to be accommodated, and the bus bar tube portion includes a bus bar elastic contact portion configured to protrude into the bus bar tube portion so as to come into elastic contact with the bus bar inserted in the bus bar tube portion.

7. The connector structure according to claim 5, wherein the window portion is provided in an upper wall of the tubular circumferential wall, and a lower wall of the tubular circumferential wall facing the window portion is closed.

8. The connector structure according to claim 5, wherein an upper side of the holder mounted to the housing and an upper side of the fuse attached to the holder are exposed from the window portion, and an lower side of the holder mounted to the housing and a lower side of the fuse attached to the holder are covered by the tubular circumferential wall facing the window portion.

9. The connector structure according to claim 5, wherein the terminal portion is provided on an outer surface of the fuse, and the fuse elastic contact portion of the fuse terminal is configured to be elastically fitted onto the terminal portion.

10. The connector structure according to claim 5, wherein the terminal portion of the fuse includes a tab portion having a plate shape, the fuse terminal includes a fuse tube portion into which the tab portion is to be inserted, and the fuse tube portion includes a fuse elastic contact portion configured to protrude into the fuse tube portion so as to come into elastic contact with the tab portion inserted in the fuse tube portion.

* * * * *